United States Patent [19]

Ring

[11] Patent Number: 5,621,777
[45] Date of Patent: Apr. 15, 1997

[54] PUMP DRIVE SYSTEM FOR RECIRCULATION OF COOLANT FLOW IN A NUCLEAR REACTOR VESSEL

[75] Inventor: Christer Ring, Västerås, Sweden

[73] Assignee: ABB Atom AB, Västerås, Sweden

[21] Appl. No.: 381,861

[22] PCT Filed: Nov. 18, 1994

[86] PCT No.: PCT/SE94/01096

§ 371 Date: Feb. 7, 1995

§ 102(e) Date: Feb. 7, 1995

[87] PCT Pub. No.: WO95/15024

PCT Pub. Date: Jun. 1, 1995

[30] Foreign Application Priority Data

Nov. 24, 1993 [SE] Sweden ................ 9303889-1

[51] Int. Cl.$^6$ ................ H02J 9/06; G21C 9/00
[52] U.S. Cl. ................ 376/277; 318/161
[58] Field of Search ................ 376/277, 361, 376/372, 379, 391, 402, 406, 463; 318/161, 150

[56] References Cited

U.S. PATENT DOCUMENTS

| 4,358,719 | 11/1982 | Currier et al. | 318/161 |
|---|---|---|---|
| 4,920,303 | 4/1990 | Perdriat | 318/161 |
| 4,937,507 | 6/1990 | Masui et al. | 318/150 |

FOREIGN PATENT DOCUMENTS 2186130  8/1987  United Kingdom ................ 376/277

*Primary Examiner*—Daniel D. Wasil
*Attorney, Agent, or Firm*—Watson Cole Stevens Davis, P.L.L.C.

[57] ABSTRACT

The invention relates to a drive system for internal recirculation of coolant in a nuclear reactor (1), wherein the drive system for a main recirculation pump (10) for the coolant recirculation comprises a pump motor (11) connected to the main recirculation pump (10) and a static frequency converter (F) for connection to an alternating voltage network (16) and for feeding the pump motor (11). The frequency converter (F) comprises a rectifier (12) for connection between the alternating voltage network (16) and a d.c. intermediate link (15) and a first inverter (13) for connection between the d.c. intermediate link (15) and the pump motor (11). The invention is characterized in that the energy storage magazine, for example a flywheel (18), is connected to the d.c. intermediate link (15) via a second inverter (14). The invention is further characterized in that the second inverter (14) is adapted, in the event of loss of voltage from the alternating voltage network (16), to feed back energy from the energy storage magazine (18) to the d.c. intermediate link (15) for controlled direct or delayed reduction via the first inverter (13) of the speed of the main recirculation pump (10).

10 Claims, 2 Drawing Sheets

PUMP DRIVE SYSTEM FOR RECIRCULATION OF COOLANT FLOW IN A NUCLEAR REACTOR VESSEL

TECHNICAL FIELD

The present invention relates to a drive system for a nuclear reactor, more particularly a drive system intended to drive a main recirculation pump for recirculation of coolant in a vessel arranged in the reactor.

BACKGROUND ART, PROBLEMS

A boiling water reactor normally comprises an external, substantially cylindrical, vertical container referred to as a reactor vessel, in the lower part of which a substantially cylindrical vertical moderator vessel is arranged. The moderator tank comprises a core of fuel rods. Between the outer wall of the moderator tank and the inner wall of the reactor vessel, there is an annular space referred to as a downcomer. The reactor vessel is partially filled with a coolant (water) for cooling a core of fuel rods arranged in the moderator tank.

During operation of the reactor, that is, during nuclear fission, the water starts boiling when it has reached to approximately one-fourth of the core. The steam thus formed is separated from the water at the upper part of the reactor vessel, partly in steam separators and partly in steam dryers arranged to separate the last moisture residues in the steam before it flows out of the reactor vessel. The separated water flows down into the downcomer. To replace the water which is taken out of the reactor vessel in the form of steam, the reactor vessel is supplied with water via a feedwater inlet. Thus, the downcomer contains a mixture of incoming feedwater and water which is separated from the steam in the steam separators and the steam dryers.

In the downcomer at the bottom of the reactor vessel, main recirculation pumps of plug-in type are arranged for recirculation of water from the downcomer and up through the core for continuous cooling of the fuel rods. The main recirculation pumps normally consist of vertical wet asynchronous machines operating in water under pressure.

The adjustable recirculation flow of the coolant is utilized for controlling the output power from the reactor in that an increased coolant flow, in addition to an increased cooling of the fuel rods, also results in an increased power production (increased neutron generation) in the fuel rods. As a result of the thermal inertia in the fuel rods, the time constant for increased power production in the fuel rods differs from the time constant for the corresponding increase of the cooling requirement. If the supply of energy to one or more main recirculation pumps is disturbed, the cooling and the power production are interrupted instantaneously whereas the surface temperature of the fuel rods rises since the fuel rods contain a decay power in the form of thermal energy which is not yet exhausted.

During normal operation of the reactor, the fuel rods are surrounded by a coolant film. At too rapid a reduction of the coolant flow, the decay power which is stored in the fuel rods will result in a brief overheating thereof. In those cases where this overheating leads to the heat flux from a fuel rods becoming very great in relation to the coolant flow, there may be a risk of dryout occurring, that is, the coolant film becomes so thin that it is unable to hold together. The coolant film is broken up and dry wall portions are formed, which locally leads to a considerably deteriorated thermal transmittance between the fuel rod and the coolant with an ensuing greatly increased surface temperature of the fuel rod. The increased surface temperature may lead to damage with serious consequences arising on the fuel rods, or to a shortening of the service life thereof.

To secure against dryout, the power output from the fuel rod is limited such that a margin with respect to dryout in case of transients in the coolant flow is obtained. This margin, referred to as dryout margin, means that the fuel cannot be utilized as efficiently as would otherwise be possible. Therefore, from the point of view of fuel economy, it is desirable to minimize the dryout margin. One of the dimensioning factors for the dryout margin is disturbance of the coolant flow as a result of line power loss for shorter or longer periods.

The dryout margin in the case of disturbances of the energy supply to the main recirculation pumps is dependent on how fast the main recirculation pumps unroll, that is, on the time rate of change of the pump speed. The time rate of change is determined by the kinetic energy of the pump, that is, the inertia in the drive system of the main recirculation pump. The unroll time is thus dimensioning for the power output from the fuel rods.

To increase the unroll time it is desirable to increase the inertia in the drive system of the main recirculation pumps. Because of the design of the reactor, the space for pumps and motors is limited, which gives a pump/motor design which is relatively long and narrow with a limited moment of inertia. The limited space in the reactor vessel means that it is not possible to increase the dimension of the main recirculation pump to obtain increased inertia. The space in the reactor vessel only allows increased inertia by replacing material in certain parts of the main recirculation pump by heavier material. However, this is not sufficient to obtain the desired inertia.

For driving a main recirculation pump, it is known to use a drive system comprising a pump motor for driving the pump and a rotating frequency converter for feeding the pump, the frequency converter comprising a motor which via a hydraulic coupling is connected to a generator. The rotating frequency converter is electrically connected between a supply alternating voltage network and the pump motor. The rotating frequency converter may be provided with a flywheel for increasing the inertia in the drive system and hence limiting the unroll speed of the main recirculation pump. The disadvantage of the rotating frequency converter is that it limits the speed of action when controlling the power of the reactor. The rotating frequency converter cannot maintain the speed of the main recirculation pump in case of a voltage loss but only extend the unroll time thereof. A poor efficiency is a general disadvantage for hydraulic couplings.

Another way of extending the unroll time is to connect in the drive system, in series with the rotating motor-generator equipment (without hydraulic coupling), a static frequency converter, the static frequency converter comprising power electronics components in the form of a rectifier connected to a d.c. intermediate link which, in turn, is connected to an inverter for feeding the pump motor. The static frequency converter is fed from the rotating motor-generator equipment which, in turn, is fed from an alternating voltage network. In this way, the drive system is supplied with inertia via the rotating motor-generator equipment whereas the control speed is made possible by the static frequency converter. The disadvantage of this method of extending the unroll time is that modern conventional static frequency converters of pulse-width modulated type are sensitive to voltage deviations in the supply to the rectifier. In those cases where the rectifier is supplied from the generator of the rotating frequency converter, it is difficult to maintain the voltage from the generator when this unrolls. Older static frequency converters are less sensitive to voltage deviations, so the method described above is adapted to these older models. Further, the method requires two machines, namely a motor and a generator. The generator must be of a synchronous machine type, which is more expensive and less reliable than a simpler and more robust asynchronous machine. The network must be able to manage direct start of the flywheel, which limits the maximally possible inertia in the system. In addition, the motor and the generator must be dimensioned for the rated power of the main recirculation pump. Further, the rotating motor-generator equipment has a relatively large service requirement compared with the static frequency converter.

The introduction of inertia in the drive system for a main recirculation pump is of advantage in the event of loss of line power but of disadvantage as regards the speed of action for control of the power production of the reactor. The requirement for control speed in the reactor has increased and, therefore, drive systems comprising only rotating frequency converters are no longer used in new designs.

In a boiling water reactor, normally between four and ten main recirculation pumps are arranged. Only events which lead to unroll of the majority of these pumps give rise to dryout.

One object of the invention is to achieve, for a given, total main recirculation pump dimension, an increased inertia in the drive system thereof for maintaining the speed of the main recirculation pump in the event of loss of supply voltage from the network.

SUMMARY OF THE INVENTION, ADVANTAGES

The invention relates to a drive system for a main recirculation pump for internal coolant recirculation in a nuclear reactor of boiling water type in which the drive system in case of voltage loss from a supply alternating voltage network, directly or with a delay, in a controlled manner reduces the speed of the pump to a predetermined minimum speed. In case of delayed reduction, energy supply to the main recirculation pump, and hence the speed thereof, are maintained for a predetermined period of time, whereupon, if the voltage does not return within the predetermined period, a controlled reduction of the speed of the pump is achieved.

The maintenance of the energy supply to the main recirculation pump and the controlled reduction, respectively, are achieved by introducing inertia in the drive system of the main recirculation pump. The drive system comprises a pump motor for operation of the pump and a static frequency converter connected between the network and the pump motor. The static frequency converter comprises a rectifier connected between the network and a d.c. intermediate link and a first inverter connected between the d.c. intermediate link and the pump motor. The inertia is supplied to the drive system by connecting to the d.c. intermediate link, via a second static inverter, an energy storage magazine, which, for example, consists of a flywheel which is driven by an asynchronous machine. The second inverter is adapted to operate in two operating modes, rectifier and inverter mode, respectively.

During normal operation, both the main recirculation pump and the flywheel are fed with energy via the common rectifier and the common d.c. intermediate link. During normal operation, the second inverter operates in the inverter mode for driving the asynchronous machine which functions as a motor for driving the flywheel.

In case of loss of the line voltage to the static frequency converter, the second inverter is controlled such that energy is fed back from the flywheel via the asynchronous machine to the d.c. intermediate link such that the direct voltage level is maintained. Thus, in case of loss of the line voltage, the asynchronous machine serves as a generator and the second inverter operates in the rectifier mode. The energy stored in the flywheel can then be used for controlled reduction of the speed of the main recirculation pump or for maintaining the speed of the main recirculation pump for a predetermined period of time and then possibly reducing the speed.

Thus, the invention entails a possibility of either reducing the speed of the pump directly or reducing the speed of the pump with a delay, that is, reducing the speed only when a certain predetermined period of time has elapsed and the line voltage has not yet returned.

In those cases where a direct reduction is chosen, the dimensions of the second inverter and the asynchronous machine are adapted to the power which is required to reach sufficient inertia in the unroll of the main recirculation pump for direct reduction in the case of voltage loss. The second inverter and the asynchronous machine are dimensioned to provide at least the additional power required to limit the unroll from the inherent unroll of the pump to the desired unroll.

In those cases where a delayed reduction is chosen, the flywheel is dimensioned such that the speed is maintained for the predetermined period of time such that the core is kept uninfluenced in case of loss of line voltage during this period of time. In those cases where the line voltage returns within the predetermined period of time, the main recirculation pumps remain in operation completely uneffected by the disturbance. The flywheel is reaccelerated to the original speed whereupon the drive system again manages a line voltage loss. In those cases where the voltage does not return, the speed of the main recirculation pump is reduced to a minimum speed whereupon it is tripped.

It is known per se to feed several motors via separate inverters from a common d.c. intermediate link. It is also known to feed back energy, during braking, from an asynchronous machine to the d.c. intermediate link where either a braking resistor burns away the braking energy or the energy is fed back to the network via a rectifier adapted for this purpose. Using the braking energy from an asynchronous motor for accelerating another asynchronous motor connected to the same common d.c. intermediate link is also known in applications which include braking. However, the invention relates to feedback of energy from the flywheel to the frequency converter in those cases where the line voltage is cut off for further supply of energy from the frequency converter to the main recirculation pump for controlled direct or delayed reduction of the speed of the pump to a minimum speed. There is no possibility of storing energy in the frequency converter. If this were possible, the stored energy could be used for controlled reduction. The energy which is fed back to the static frequency converter must either be burnt in a resistor or be forwarded to a consumer.

When the flywheel is connected via a separate second inverter, the speed of the main recirculation pump can be controlled independently of the speed of the flywheel. The flywheel can then constantly be driven by the asynchronous machine at full speed during normal operation. This allows maximum energy to be stored in the flywheel independently of the speed of the main recirculation pump. Only directly after a line voltage loss is the stored energy limited since the flywheel must then be reaccelerated.

Since the speed of the flywheel is independent of the speed of the pump, the inertia of the flywheel does not limit a rapid change of speed in those cases where such change is necessary. A relatively rapid reduction is, for example, necessary during a reactor scram. Nor is the control speed of the drive system limited by the inertia of the flywheel. The invention permits the flywheel, if desired, to be oversized so as to provide an ample addition of inertia without negatively influencing the reduction in case of a reactor scram or the control speed, which would be the case if a rotating frequency converter were used.

An important advantage of feeding back energy from the flywheel via the second inverter to the d.c. intermediate link is that an asynchronous machine can be used instead of a synchronous machine for operation of the flywheel. The asynchronous machine is considerably more robust and simple than the synchronous machine which has to be used if energy is to be transmitted electrically from the flywheel to the pump motor. Further, the asynchronous machine is both less expensive and more reliable than the synchronous machine.

The invention permits the selection of both direct and delayed reduction of the speed of the pump when dimensioning the drive system.

When selecting direct reduction of the speed of the pump, the dimensioning of the converter and the asynchronous machine may be adapted to the power which is required to reach sufficient inertia in the unroll of the main recirculation pump. The converter and the asynchronous machine are thus dimensioned to provide at least the additional power which is required for limiting the unroll from the inherent unroll of the pump to the desired unroll.

The extended unroll time and the increased margin with respect to dryout connected therewith can be utilized for greater power output in the reactor or more cost-effective utilization of the fuel.

The drive system described above may, of course, also be arranged in a reactor of a different type, for example a pressurized-water reactor or a graphite-moderated reactor. The description refers to internal main recirculation pumps but the drive system may, of course, be arranged also with external main recirculation pumps.

BRIEF DESCRIPTION OF THE DRAWINGS

The invention will be most readily understood with reference to the accompanying drawings.

DESCRIPTION OF THE PREFERRED EMBODIMENTS

Figure 1:
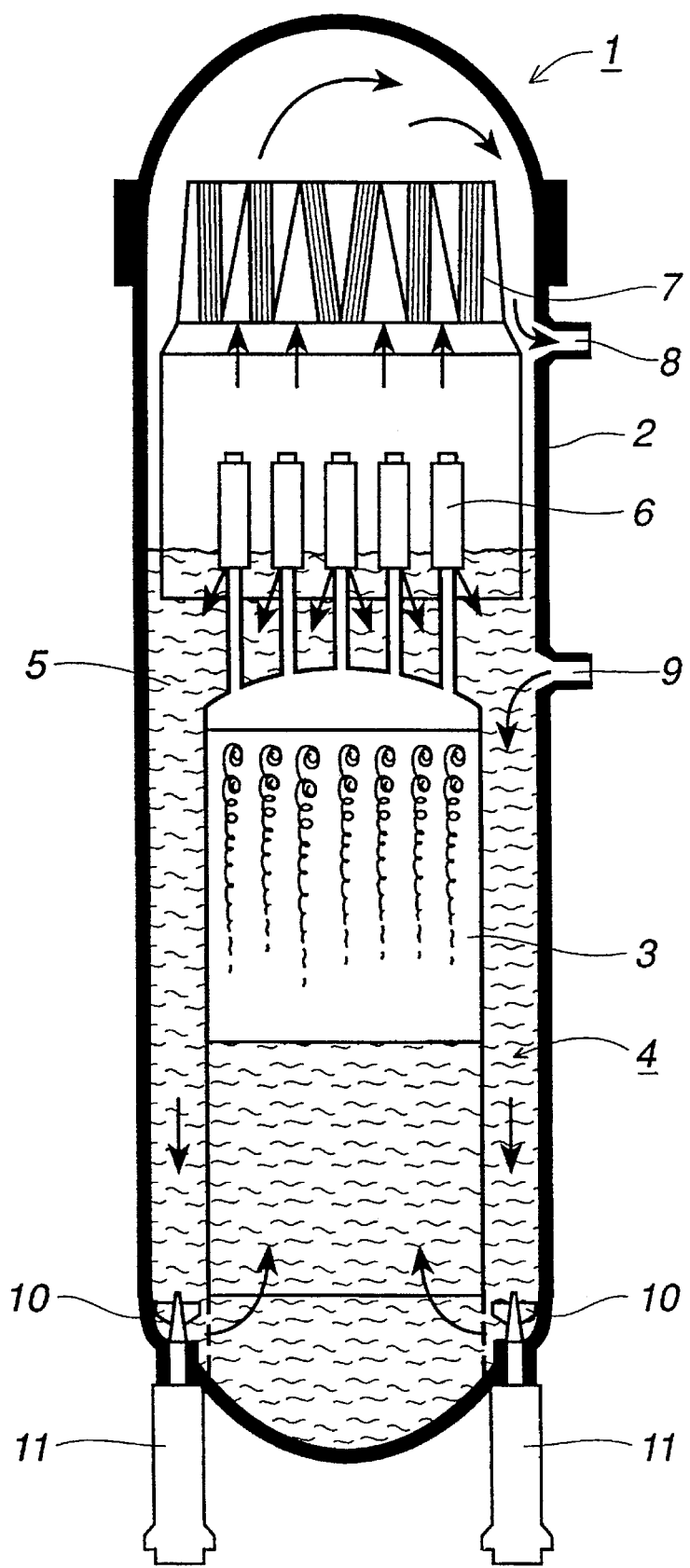
FIG. 1 schematically shows a nuclear reactor vessel with internal parts according to the prior art.

FIG. 1 shows a nuclear reactor 1 which comprises an external, substantially cylindrical, vertical container referred to as reactor vessel 2. Inside the reactor vessel 2 at the lower part thereof, a substantially cylindrical vertical moderator tank 3 is arranged. The moderator tank 3 comprises a core of fuel rods (not shown). Between the outer wall of the moderator tank 3 and the inner wall of the reactor vessel 2, there is an annular space referred to as downcomer 4. The reactor vessel 2 is partially filled with a coolant 5 (water) for cooling the core.

During operation of the reactor 1, that is, during nuclear fission, the water starts boiling when it has reached a level where it covers approximately one-fourth of the core. The steam thus formed is separated from the water at the upper part of the reactor vessel 2 by means of steam separators 6 and steam dryers 7 before the steam flows out of the reactor tank 2 via a steam outlet 8. The separated water flows down into the downcomer 4. To replace the water which is taken out of the reactor vessel 2 in the form of steam via the steam outlet 8, the reactor vessel 2 is supplied with water via a feedwater inlet 9. The downcomer 4 thus contains a mixture of incoming feedwater and water which is separated from the steam in the steam separators 6 and the steam dryers 7.

In the downcomer 4, at the bottom of the reactor vessel 2, main recirculation pumps 10 of plug-in type are arranged for recirculation of water from the downcomer 4 and up through the core for continuous cooling of the fuel rods therein. The main recirculation pumps 10 are usually driven by vertical wet asynchronous machines 11 operating in water under pressure. The arrows in FIG. 1 symbolically show the flow paths of the water and the steam, respectively, through the reactor 1.

Figure 2:
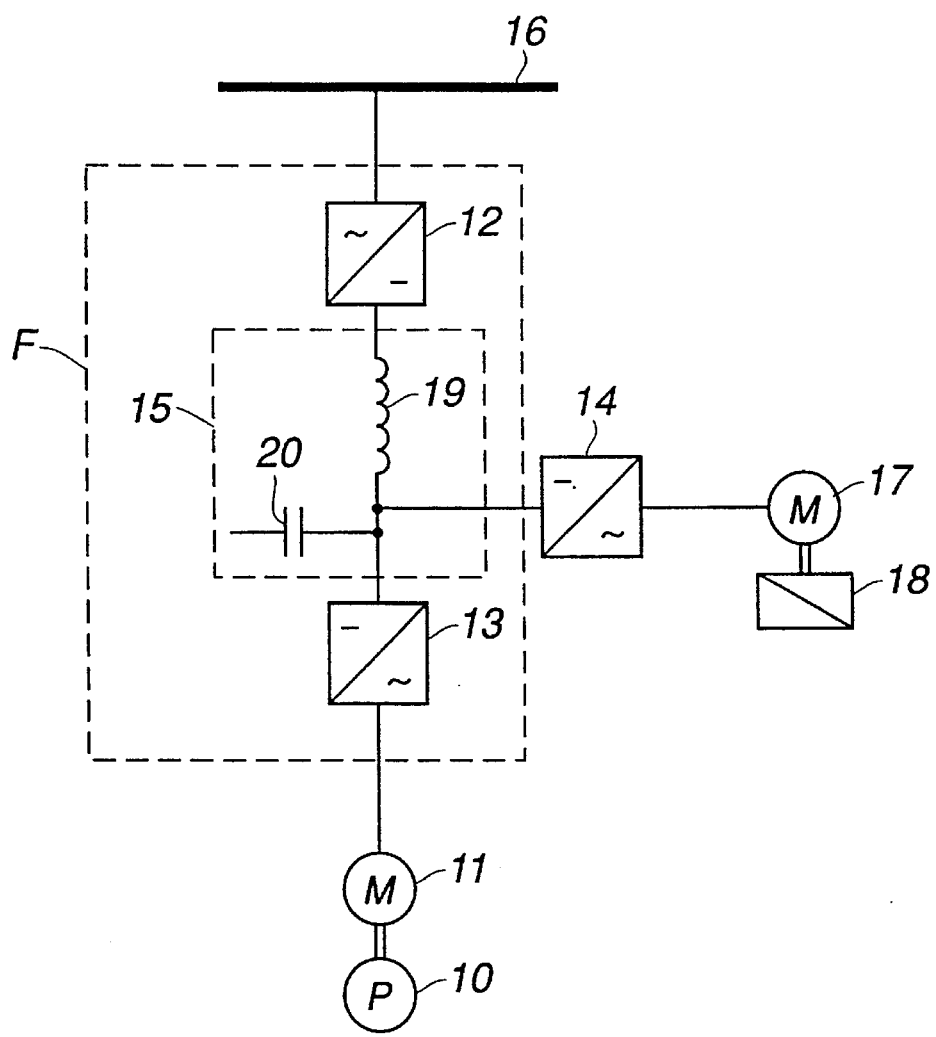
FIG. 2 schematically shows a drive system for a main recirculation pump according to the invention.

FIG. 2 shows the principles of a drive system for a main recirculation pump 10 for internal recirculation of coolant in the nuclear reactor 1. The drive system comprises a pump motor 11 connected to the main recirculation pump 10 and a static frequency converter F for connection to an alternating voltage network 16 and for feeding the pump motor 11. The frequency converter F comprises a rectifier 12 for connection between the alternating voltage network 16 and a d.c. intermediate link 15 and a first inverter 13 for connection between the d.c. intermediate link 15 and the pump motor 11, The drive system further comprises a flywheel 18 connected to an asynchronous machine 17, which is turn is connected to the d.c. intermediate link 15 via a second static inverter 14. The second inverter 14 operates in two operating modes, rectifier and inverter mode, respectively. The d.c. intermediate link 15 comprises an inductive reactor 19 and a capacitor 20. The asynchronous machine 17 is adapted, in case of loss of voltage from the alternating voltage network 16, to feed back energy from the flywheel 18 to the d.c. intermediate link 15 via the second inverter 14 for controlled direct or delayed reduction of the speed of the main recirculation pump 10.

The speed of the main recirculation pump 10 is controlled by control of the frequency fed to the pump 10 by means of the static frequency converter F. The speed of the pump 10 depends on the frequency of the alternating voltage. The frequency is controllable by the frequency converter F in which the rectifier 12 transforms the line voltage with constant frequency to direct voltage, whereupon the first inverter 13 transforms the direct voltage back to alternating voltage with controllable voltage and amplitude, and feeds it to the pump motor 11.

During normal operation, the pump motor 11 and the asynchronous machine 17 are fed with energy from the network 16 via the d.c. intermediate link 15. In this case, the second inverter 14 operates in the inverter mode for feeding the asynchronous machine 17 which serves as a motor for operation of the flywheel 18 and storage of energy therein. In case of loss of line voltage, energy from the flywheel 18 is fed back via the second inverter 14, which then operates in the rectifier mode, back to the d.c. intermediate link 15 which, in turn, feeds energy via the first inverter 13 and the pump motor 11 to the main recirculation pump 10 for direct or delayed reduction of the speed thereof to a predetermined minimum speed.

In case of delayed reduction of the speed of the main recirculation pump 10, the second inverter 14 is adapted, in the absence of voltage from the supply alternating voltage network 16, for a predetermined period of time to maintain the speed of the main recirculation pump 10 and then, unless the voltage returns after a time longer than the predetermined time, to reduce the speed of the main recirculation pump 10 to the predetermined minimum speed.

The first inverter 13 and the second inverter 14 are of a pulse-width modulated type, that is, the alternating voltage is built up from pulses whose amplitude is equal to the direct voltage supplied by the rectifier 12. The width, frequency and polarity of the pulses are controlled such that the alternating voltage is given the desired frequency and magnitude.

The rectifier 12 is of a conventional diode design. Since there is no need for simultaneous acceleration of the flywheel 18 and the main recirculation pump 10, the rectifier 12 is dimensioned to manage the operation of the main recirculation pump 10.

The first inverter 13 is dimensioned for the operation of the main recirculation pump 10. The magnitude of the second inverter 14 is determined by the extent to which the unroll is to be extended and by the losses in the drive system.

The flywheel 18 which is driven by the asynchronous machine 17 is dimensioned for maintenance of or controlled reduction of the speed of the main recirculation pump 10 in the case of line voltage loss. The size of the flywheel 18 is determined by how long time the pump operation is to be maintained in case of voltage loss and by how rapidly reduction of the pump 10 is thereafter desirable. When dimensioning the flywheel 18 it is suitable that a line voltage loss of, for example, 0.5–1.5 seconds is managed without speed reduction of the pump 10 whereupon a controlled linear reduction of the pump speed to a minimum speed should be capable of being carried out in, for example, 5–10 seconds.

The speed of the asynchronous machine 17 is independent of the speed of the main recirculation pump 10. To optimize the ability of the flywheel 18 to store energy, an asynchronous machine 17 with high-speed operation is preferably chosen. As the second inverter 14, the asynchronous machine 17 is chosen in dependence on the extent to which the unroll time is to be extended and on the losses in the drive system.

All the main recirculation pumps 10 arranged in a reactor 1 are preferably provided with the drive system according to the invention, but this is no necessity to obtain a well functioning recirculation system. The primary point is to provide a sufficient number of main recirculation pumps 10 with the drive system according to the invention in order to attain the desired reduction and the cooling reduction.

Figure 3:
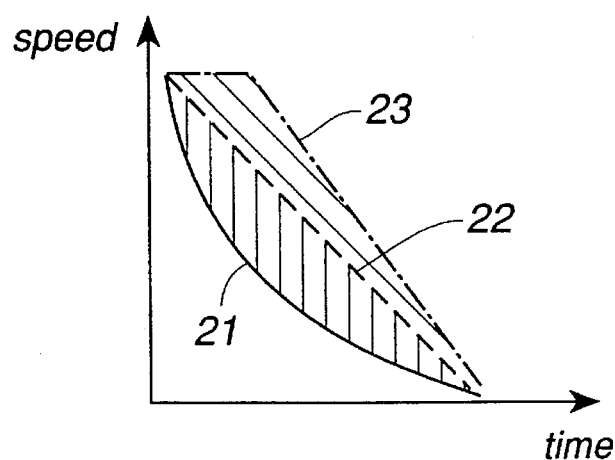
FIG. 3 shows a diagram with curves for separate unroll speeds of a main recirculation pump.

FIG. 3 shows a diagram with curves for different unroll times in the main recirculation pump 10. The y-axis of the diagram denotes the speed and the x-axis thereof denotes the time. The unbroken curve 21 shows the inherent unroll of the main recirculation pump 10 in case of line voltage loss, that is, the unroll time which is limited by the inherent inertia of the pump 10 and by inherent losses. The broken line 22 shows, in the case of line voltage loss, the speed profile for controlled reduction of the pump 10 by means of the drive system according to the invention. The dash-dotted line 23 shows, in case of line voltage loss, the speed profile when the speed is maintained in the main recirculation pump 10 for a predetermined period of time whereafter the speed is reduced in a controlled manner. By means of the drive system according to the invention, it is clear from FIG. 3 that the critical speed profile 21 in case of line voltage loss is avoided. The vertical distance between the respective speed profiles is a measure of the extra power of the drive system which is required for extending the unroll time of the main recirculation pump 10 from one speed profile, for example 21, to the other, for example 22.

I claim:

1. A drive system for a main recirculation pump for internal recirculation of coolant in a nuclear reactor, said drive system comprising a pump motor connected to the main recirculation pump and a static frequency converter for connection to an alternating voltage network and for feeding the pump motor, wherein the frequency converter comprises a rectifier for connection between the alternating voltage network and a d.c. intermediate link and a first inverter for connection between the d.c. intermediate link and the pump motor for controlling the speed of the pump, wherein the drive system comprises an energy storage magazine connected to the d.c. intermediate link via a second static inverter, which in the absence of voltage from the alternating voltage network feeds energy from the energy storage magazine back to the d.c. intermediate link for controlled reduction of the speed of the main recirculation pump, the first inverter being controllable independently of the energy in the energy storage magazine, and wherein the speed of the main recirculation pump can be rapidly reduced during a nuclear reactor trip.

2. A drive system according to claim 1, wherein the second inverter, when voltage is supplied from the alternating voltage network, charges the energy storage magazine.

3. A drive system according to claim 1, wherein the second inverter, when no voltage is supplied from the alternating voltage network, feeds energy from the energy storage magazine to the first inverter to reduce the speed of the main recirculation pump to a predetermined minimum speed directly or with a delay.

4. A drive system according to claim 3, wherein in the case of delayed reduction, the second inverter supplies energy from the energy storage magazine to the first inverter during a predetermined period of time to maintain the speed of the main recirculation pump and the second inverter after the predetermined period of time feeds energy from the energy storage magazine to the first inverter to reduce the speed of the main recirculation pump to a predetermined minimum speed.

5. A drive system according to claim 1, wherein the energy storage magazine consists of a flywheel and including an asynchronous motor connected between the second inverter and the flywheel for driving the flywheel.

6. A nuclear reactor comprising a plurality of main recirculation pumps for internal recirculation of coolant in the reactor, wherein each main recirculation pump is provided with a drive system comprising a pump motor connected to the main recirculation pump and a static frequency converter for connection to an alternating voltage network and for feeding the pump motor, wherein the frequency converter comprises a rectifier for connection between the alternating voltage network and a d.c. intermediate link and a first inverter for connection between the d.c. intermediate link and the pump motor for controlling the speed of the pump, wherein the drive system comprises an energy storage magazine connected to the d.c. intermediate link via a second static inverter, which in the absence of voltage from the alternating voltage network feeds energy from the energy storage magazine back to the d.c. intermediate link for controlled reduction of the speed of the main recirculation pump, the first inverter being controllable independently of the energy in the energy storage magazine, and wherein the speed of the main recirculation pump can be rapidly reduced during a nuclear reactor trip.

7. A method for internal recirculation of coolant in a nuclear reactor, wherein a drive system for a main recirculation pump for the coolant recirculation comprises a pump motor connected to the main recirculation pump and a static frequency converter for connection to an alternating voltage network and for feeding the pump motor, wherein the frequency converter comprises a rectifier for connection between the alternating voltage network and a d.c. intermediate link and a first inverter for connection between the d.c. intermediate link and the pump motor for controlling the speed of the pump, wherein in the absence of voltage from the supply alternating voltage network, energy is fed back to the d.c. intermediate link from an energy storage magazine connected to the d.c. intermediate link via a second inverter, the speed of the main recirculation pump being thereby reduced in a controlled manner, the first inverter being controlled independently of the energy in the energy storage magazine, and wherein the speed of the main recirculation pump is rapidly reduced during a nuclear reactor trip.

8. A method according to claim 7, wherein, when feeding the main recirculation pump from the alternating voltage network, energy is fed to the energy storage magazine via the second inverter and the energy storage magazine is thereby charged.

9. A method according to claim 7, wherein, in the absence of voltage from the supply alternating voltage network, the energy supply to the pump motor is maintained by the second inverter and the first inverter for a predetermined period of time such that the speed of the main recirculation pump is thereby maintained.

10. A method according to claim 9, wherein, in the absence of voltage from the supply alternating voltage network for a longer time than the predetermined time, the speed of the main recirculation pump is reduced by the first inverter to a predetermined minimum speed.

* * * * *